United States Patent
Jo

(10) Patent No.: US 8,702,396 B2
(45) Date of Patent: Apr. 22, 2014

(54) SEPARATIVE TIDAL CURRENT ROTOR BLADE

(75) Inventor: Chul Hee Jo, Jeju-si (KR)

(73) Assignee: Inha-Industry Partnership Institute, Incheon (KR)

( * ) Notice: Subject to any disclaimer, the term of this patent is extended or adjusted under 35 U.S.C. 154(b) by 431 days.

(21) Appl. No.: 13/127,097

(22) PCT Filed: Nov. 1, 2010

(86) PCT No.: PCT/KR2010/007584
§ 371 (c)(1),
(2), (4) Date: May 2, 2011

(87) PCT Pub. No.: WO2012/005413
PCT Pub. Date: Jan. 12, 2012

(65) Prior Publication Data
US 2012/0027600 A1    Feb. 2, 2012

(30) Foreign Application Priority Data

Jul. 9, 2010   (KR) .......................... 10-2010-0066368
Oct. 29, 2010  (KR) .......................... 10-2010-0106780

(51) Int. Cl.
*F03B 3/12*   (2006.01)

(52) U.S. Cl.
USPC ....................................... 416/204 R; 416/226

(58) Field of Classification Search
USPC .......... 416/225, 204 R, 131, 132 R, 87, 210 R
See application file for complete search history.

(56) References Cited

U.S. PATENT DOCUMENTS

2010/0143143 A1*   6/2010   Judge ............................ 416/226
2011/0091326 A1*   4/2011   Hancock ........................ 416/225

* cited by examiner

*Primary Examiner* — Richard Edgar
(74) *Attorney, Agent, or Firm* — Sherr & Jiang, PLLC

(57) ABSTRACT

Provided is a separative tidal current rotor blade including: a hub constituting a body of a rotor; a blade formed by coupling a plurality of blade blocks together; a connecting member for connecting the hub and the blade; and a coupling unit for coupling one end of the connecting member to the hub. The blade can be mass produced and has excellent compactibility by dividing a body unit of the blade into a plurality of blocks and assembling the blocks. Also, manufacturing and maintenance costs and time can be reduced since the body unit of the blade is divided into the blocks. In addition, the blade can be prevented from being damaged since a shock absorbing member is disposed between blade blocks to absorb a sudden shock.

11 Claims, 5 Drawing Sheets

SEPARATIVE TIDAL CURRENT ROTOR BLADE

CROSS REFERENCE TO PRIOR APPLICATIONS

This application is a National Stage Patent Application of PCT International Patent Application No. PCT/KR2010/007584 (filed on Nov. 1, 2010) under 35 U.S.C. §371, which claims priority to Korean Patent Application Nos. 10-2010-0066368 (filed on Jul. 9, 2010) and 10-2010-0106780 (filed on Oct. 29, 2010), which are all hereby incorporated by reference in their entirety.

TECHNICAL FIELD

The present invention relates to a separative tidal current rotor blade and more particularly, to a separative tidal current rotor blade, which changes rectilinear movement of a fluid to rotary movement by using high flow velocity of the sea to generate power.

BACKGROUND ART

A tidal power generator is generally an apparatus for generating power by using a rising tide and an ebb tide of the seawater, i.e., flow of bidirectional tidal currents. Principles similar to an overland aerogenerator are applied to the tidal power generator.

The overland aerogenerator generates power as an air blade rotates by using wind power, wherein the tidal power generates power as a blade rotates by using flow of the seawater.

Since the fluid density of seawater is 900 times or above the air density, the tidal power generator using seawater can generate more power than overland generators. However, components used in the tidal power generator must be formed of a corrosion resistant material having intensity high enough to overcome such high density and capable of enduring corrosion due to salt of seawater.

Accordingly, the blade used in the tidal power generator is heavy since it is formed of a corrosion resistant high strength alloy, and has low economic feasibility due to high material costs for manufacturing the blade.

In order to overcome such a problem, the blade is formed of a complex material using carbon fiber, glass fiber reinforced plastic (GFRP), or the like so that the blade is light, and has an integral structure from a hub to a tip of a rotor.

However, since it is difficult to manufacture the blade in an integral shape by using casting or any other processing method, it is not easy to mass produce the blade, and manufacturing costs increase.

Also, when a large blade is manufactured, it is difficult to manage manufacturing processes since quality and manufacturing processes of the entire large blade are affected when a local defect is generated.

DISCLOSURE

Technical Problem

The present invention provides a separative tidal current rotor blade that is easily assembled by using a separative blade, capable of mass production, and has excellent corrosion resistance to be used in a marine environment.

Technical Solution

According to an aspect of the present invention, there is provided a separative tidal current rotor blade including: a hub constituting a body of a rotor; a blade formed by coupling a plurality of blade blocks together; a connecting member for connecting the hub and the blade; and a coupling unit for coupling one end of the connecting member to the hub.

A concave combining groove may be formed at one side of the blade block, and an uneven protrusion corresponding to the combining groove may be formed at another side of the blade block. The protrusion of the blade block may include a packing member for maintaining airtightness while relieving a shock of a ground surface when the protrusion is inserted into a combining groove of another blade block. The connecting member may include: a flange coupled to the hub; a stopper for supporting one side of the blade and preventing the blade from moving; a cylindrical shaft disposed between the flange and the stopper, and operating as a supporting structure; and a shaft unit disposed at one side of the stopper and connecting the plurality of blade blocks together, wherein the flange, the stopper, the cylindrical shaft, and the shaft are integrally formed.

The shaft unit of the connecting member may be formed of a plurality of shafts, and a thread may be formed at an end of the shaft unit. A shaft of the shaft unit may have a multistage shape, wherein a diameter of the shaft decreases from one end to another end along a length direction. A shaft of the shaft unit may have a cylindrical, rectangular, or polygonal shape.

The blade block may include a shock absorbing member therein, and an inserting hole through which a shaft of the shaft unit passes may be formed at a center of the shock absorbing member. A plurality of combining openings to which the connecting member is coupled and fixed may be formed on the hub in a radial form.

The plurality of blade blocks may be formed of plastic or reinforced plastic. A reinforcing piece for connecting a shaft unit of the connecting member, which is inserted into a fitting hole of the blade block, and the blade block may be formed on an inner side of the blade block.

Advantageous Effects

A separative tidal current rotor blade according to the present invention has following effects.

First, the blade can be mass produced and has excellent compactibility by dividing a body unit of the blade into a plurality of blocks and assembling the blocks.

Second, manufacturing and maintenance costs and time can be reduced since the body unit of the blade is divided into the blocks.

Third, the blade can be prevented from being damaged since a shock absorbing member is disposed between blade blocks to absorb a sudden shock.

BEST MODE

Hereinafter, the present invention will be described more fully with reference to the accompanying drawings, in which exemplary embodiments of the invention are shown.

Figure 1:
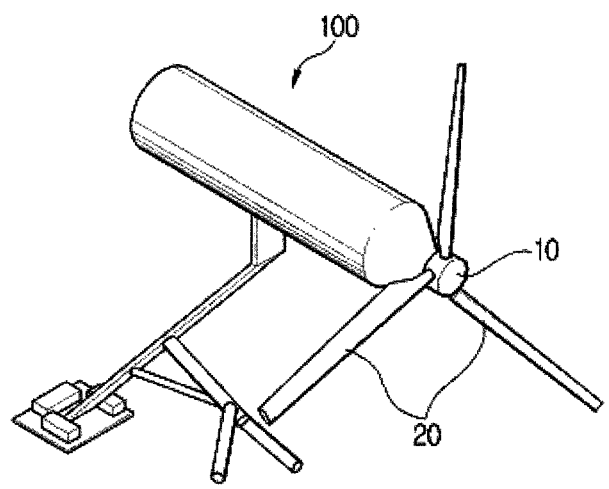
FIG. 1 is a diagram of a general tidal power generator.

Referring to FIG. 1, a general tidal power generator 100 includes a hub 10 having a conical external shape so as to receive minimum resistance with respect to flow of a fluid, and a blade 20 having a radial shape on a body of the hub 10.

The hub 10 is formed of an alloy that is not corroded due to seawater and has a conical shape in a streamlined structure so as to minimize resistance. Also, the blade 20 has a streamlined wing shape so as to rotate by colliding with the fluid.

Referring to FIGS. 2 through 6, a separative tidal current rotor blade includes the hub 10 constituting a body of a rotor, the blade 20 formed as a plurality of blade blocks 30 are coupled together, a connecting member 40 for connecting the hub 10 and the blade 20, and a coupling unit 50 for coupling one end of the connecting member 40 and the hub 10.

The blade 20 is formed as the blade blocks 30 are coupled to each other by the connecting member 40, wherein the blade blocks 30 are coupled together by the hub 10 and the coupling unit 50.

Figure 3:
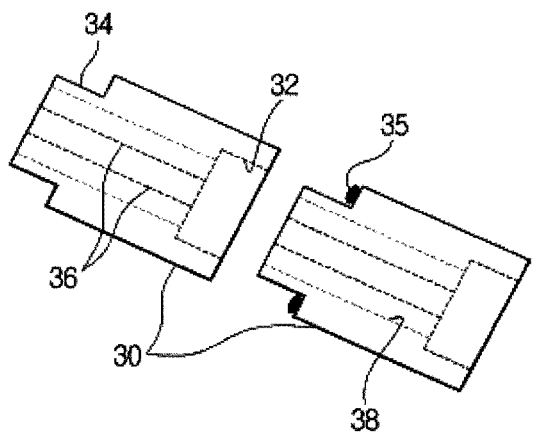
FIG. 3 is a diagram for describing how blade blocks of FIG. 2 are coupled together.

Referring to FIG. 3, a concave combining groove 32 is formed at one side of each blade block 30, and a protrusion 34 having an uneven shape corresponding to the combining groove 32 is formed at another side of each blade block 30. Also, a fitting hole 36 and a storage unit 38 are formed inside a body of each blade block 30.

The combining groove 32 and the protrusion 34 of the blade block 30 may have an oval, rectangular, or polygonal shape so as to prevent a combined portion from rotating or being reverted.

The protrusion 34 of one blade block 30 is inserted and firmly combined to the combining groove 32 of another blade block 30, and thus rotatory power may be transmitted without distortion or deformation of the blade 20 due to external marine environments.

The protrusion 34 includes a packing member 35. The packing member 35 maintains airtightness when the protrusion 34 of one blade block 30 is inserted into the combining groove 32 of the other blade block 30, and relieves a shock of a grounded portion.

The blade block 30 may be formed of plastic or reinforced plastic so that the blade block 30 is light, is strong against an external shock, is economical, has a short manufacturing time, and is not corroded due to seawater.

Generally, reinforced plastic has good intensity and may be molded in about a width of 2 m. Since the blade 20 of the current embodiment of the present invention is formed of the plurality of blade blocks 30, the blade 20 may be formed of reinforced plastic having high intensity.

One blade 20 is formed by connecting the blade blocks 30 to each other by inserting a shaft unit 44 of the connecting member 40 into the fitting hole 36 of the blade block 30. A shock absorbing member 60 is filled in the storage unit 38 of the blade block 30.

The shock absorbing member 60 relieves an external shock transmitted to each blade block 30 of the blade 20, so that the external shock is not transmitted to the blade 20 formed as the blade blocks 30 are coupled together, and the hub 10.

An inserting hole 62 into and through which the shaft unit 44 of the connecting member 40 is inserted and passes is formed in a center of the shock absorbing member 60.

Figure 4:
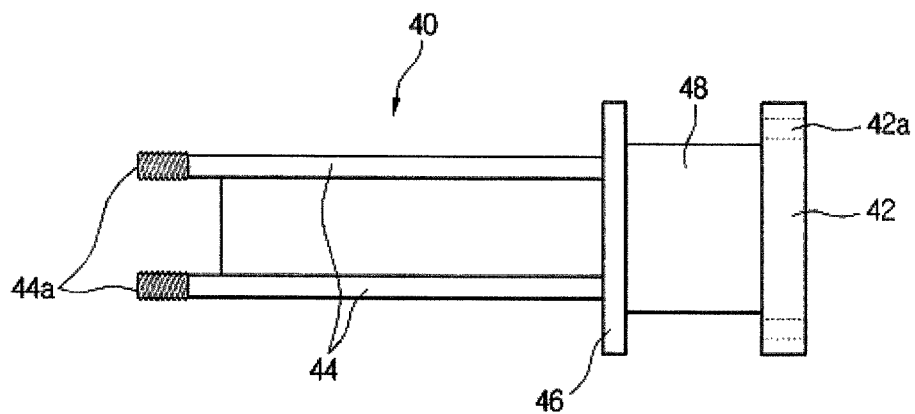
FIG. 4 is a diagram of a connecting member of FIG. 2, according to an embodiment of the present invention.

Referring to FIG. 4, the connecting member 40 that is inserted into the fitting hole 36 of each blade block 30 to connect the blade blocks 30 to each other and couple the blade blocks 30 to the hub 10 includes a flange 42, the shaft unit 44, a stopper 46, and a cylindrical shaft 48, which are integrally formed.

The flange 42 couples the connecting member 40 to the hub 10, and is inserted into a combining opening 12 of the hub 10 thereby being inserted into a coupler (not shown) formed in the combining opening 12 so as to be coupled by the coupling unit 50.

A through hole 42a into which the coupler formed in the combining opening 12 may be formed on the flange 42. However, the present invention is not limited to the coupler being inserted into the through hole 42a, and the coupling unit 50 may be inserted into the through hole 42a to be coupled to the hub 10.

Since considerable load and twist, and flexural moment affect the cylindrical shaft 48 when the blade 20 rotates, the cylindrical shaft 48 may be formed of a metal having excellent hardness to endure such load.

The shaft unit 44 of the connecting member 40 may be disposed at one side of the stopper 46 so as to connect the blade blocks 30 together, and may be formed of a plurality of shafts. The plurality of shafts are connected to each other by the stopper 46, and thus the shafts may secure intensity.

A thread 44a is formed at each end of the shafts of the shaft unit 44. The blade blocks 30 form one blade 20 as the coupling unit 50 is coupled to the thread 44a.

Figure 2:
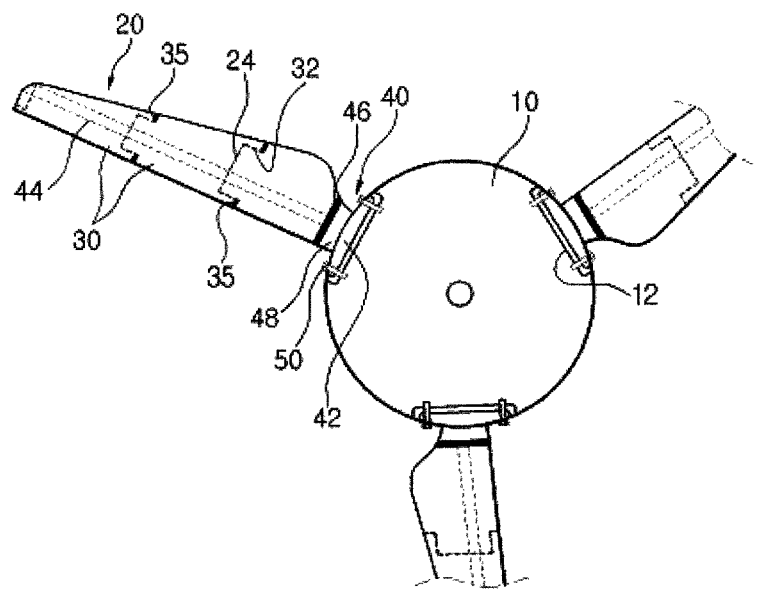
FIG. 2 is a diagram schematically illustrating a separative tidal current rotor blade, according to an embodiment of the present invention.

Referring to FIGS. 2 through 4, the blade 20 is formed by coupling the blade blocks 30 together by using the connecting member 40 including the shaft unit 44. Also, width of the blade 20 decreases farther from the hub 10 and increases nearer to the hub 10. The shaft unit 44 effectively supports power of tidal currents that is stronger toward the hub 10.

Also, the shafts of the shaft unit 44 generally have a circular shape, but alternatively, the shafts may be a rectangular or polygonal shape.

Figure 5:
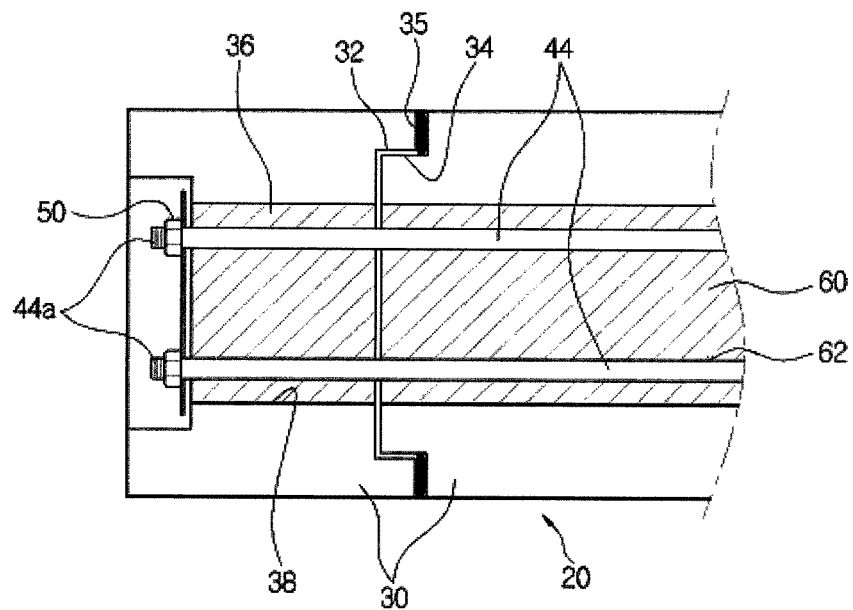
FIG. 5 is a diagram of an internal structure of FIG. 2, according to an embodiment of the present invention.

Referring to FIG. 5, the blade blocks 30 form one blade 20 by being connected to each other by the connecting member 40 and the coupling unit 50, wherein the shock absorbing member 60 is filled inside the blade 20.

The blade blocks 30 are assembled by sequentially inserting the shaft unit 44 of the connecting member 40 into the fitting hole 36 of each blade block 30 while the shaft unit 44 is held at the end of the stopper 46 of the connecting member 40, and mutually combining the combining groove 32 of each blade block 30 to the protrusion 34 including the packing member 35. The blade blocks 30 inserted into the shaft unit 44 of the connecting member 40 are integrally fixed by coupling the coupling unit 50 to the thread 44a at the end of the shaft unit 44.

Figure 6:
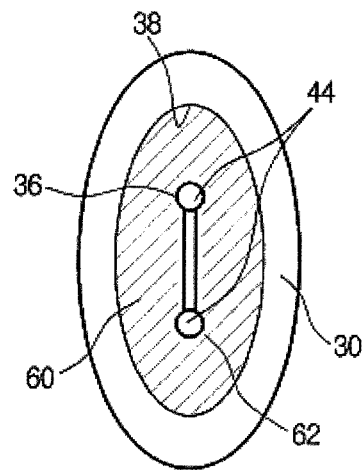
FIG. 6 is a cross-sectional view of the blade block of FIG. 2, according to an embodiment of the present invention.

FIG. 6 is a cross-sectional view of the blade block 30 of FIG. 2. Referring to FIG. 6, the shock absorbing member 60 disposed inside each blade block 30, according to an embodiment of the present invention may be formed of an epoxy material. The shock absorbing member 60 formed of the epoxy material may include the inserting hole 62 into which the shaft unit 44 of the connecting member 40 is inserted.

The shock absorbing member 60 strongly connects the shaft unit 44 and the blade block 30 and absorbs an external shock, thereby preventing the external shock from being transmitted to the blade blocks 30, the blade 20 formed by assembling the blade blocks 30, and the hub 10 coupled to the blade 20.

The plurality of combining openings 12 is formed on a body of the hub 10 along a circumferential surface of the hub 10. The connecting member 40 is coupled to the combining opening 12, and the blade blocks 30 are inserted into and assembled to the shaft unit 44 of the connecting member 40 to form one blade 20.

The plurality of blades 20 are included in the hub 10 in such a manner, generally 3 or 4.

In other words, according to the separative tidal current rotor blade, one blade 20 is formed by coupling the connecting member 40 to the hub 10 including the combining openings 12 by using the coupling unit 50, and sequentially assembling the blade blocks 30 to the shaft unit 44 of the connecting member 40.

The blades 20 are formed on the body of the hub 10 along the circumferential surface to generate power by converting linear flow of the fluid to rotary movement to activate a separate generator.

As described above, according to the embodiment of the present invention, it is possible to mass produce the blade 20, and absorb a shock by using the shock absorbing member 60 when a sudden shock is generated in the sea thereby preventing the blade 20 and the hub 10 from being damaged. Also, the blade 20 has excellent corrosion resistance since it is formed of light plastic or reinforced plastic. In addition, since the blade 20 is light, an initial activating speed of the rotor may be decreased.

[Mode For Invention]

Other embodiments of the present invention will now be described with reference to attached drawings.

A separative tidal current rotor blade according to other embodiment of the present invention is identical to the separative tidal current rotor blade according to the previous embodiment of the present invention, except for a connecting member and a blade block. Accordingly, descriptions about the identical structures will not be repeated, and structures of a connecting member 140 and a blade block 130 will be described in detail.

Figure 7:
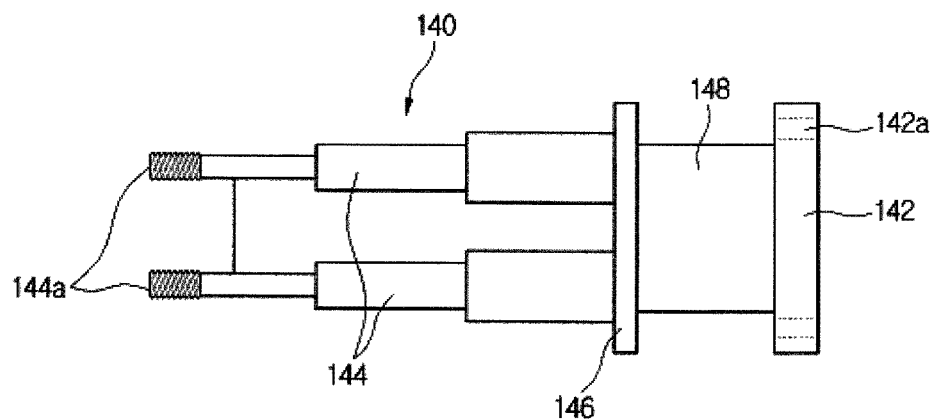
FIG. 7 is a connecting member of a separative tidal current rotor blade, according to another embodiment of the present invention.

FIG. 7 is a diagram of the connecting member 140 of the separative tidal current rotor blade, according to an embodiment of the present invention. Referring to FIG. 7, the connecting member 140 includes a flange 142, a shaft unit 144, a stopper 146, and a cylindrical shaft 148, which are integrally formed. Here, the shaft unit 144 has a multistage shape, wherein a diameter of a shaft of the shaft unit 144 increases toward a hub. Accordingly, in the separative tidal current rotor blade according to the current embodiment of the present invention, the shafts of the shaft unit 144 effectively support power of tidal currents, which increases toward the hub.

Figure 8:
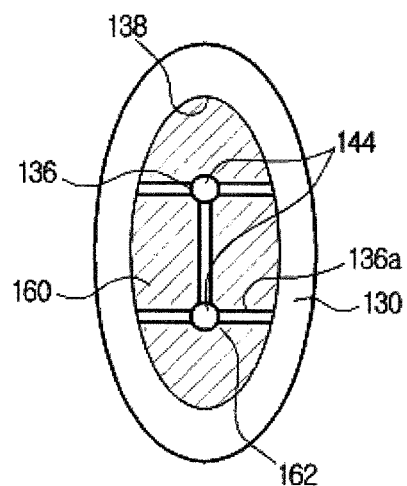
FIG. 8 is a cross-sectional view of a blade block according to another embodiment of the present invention.

FIG. 8 is a cross-sectional view of the blade block 130 according to another embodiment of the present invention. Referring to FIG. 8, a separate reinforcing piece 136*a* is formed at a fitting hole 136 of the blade block 130 to support the shaft unit 144 of the connecting member 140.

Figure 9:
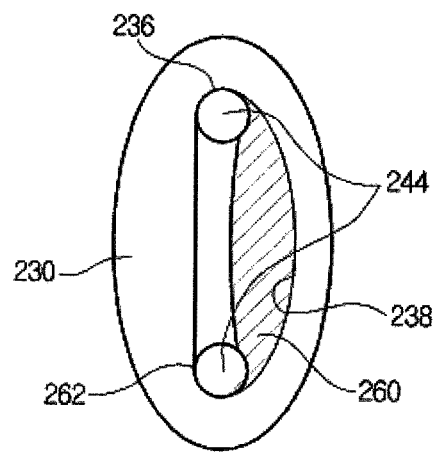
FIG. 9 is a cross-sectional view of a blade block according to another embodiment of the present invention.

FIG. 9 is a cross-sectional view of a blade block 230 according to another embodiment of the present invention. Referring to FIG. 9, a curved surface of an inner wall of the blade block 230 is formed to support a shaft unit 244 of a connecting member, thereby preventing the shaft unit 244 from moving.

Here, the inner wall of the blade block 230 may be an angled surface having a corner, but in this case, the corner of the blade block 230 may crack due to vibration of a fluid.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention may be used as a tidal power generator for generating power by using seawater.

The invention claimed is:

1. A separative tidal current rotor blade comprising:
 a hub constituting a body of a rotor;
 a blade formed by coupling a plurality of blade blocks together;
 a connecting member for connecting the hub and the blade, wherein the connecting member comprises:
  a flange coupled to the hub;
  a stopper for supporting one side of the blade and preventing the blade from moving;
  a cylindrical shaft disposed between the flange and the stopper, and operating as a supporting structure; and
  a shaft unit disposed at one side of the stopper and connecting the plurality of blade blocks together,
  wherein the flange, the stopper, the cylindrical shaft, and the shaft are integrally formed; and
 a coupling unit for fixing the flange of the connecting member to the hub.

2. The separative tidal current rotor blade of claim 1, wherein a concave combining groove is formed at one side of the blade block, and an uneven protrusion corresponding to the combining groove is formed at another side of the blade block.

3. The separative tidal current rotor blade of claim 2, wherein the protrusion of the blade block comprises a packing member for maintaining airtightness while relieving a shock of a ground surface when the protrusion is inserted into a combining groove of another blade block.

4. The separative tidal current rotor blade of claim 1, wherein the shaft unit of the connecting member is formed of a plurality of shafts, and a thread is formed at an end of the shaft unit.

5. The separative tidal current rotor blade of claim 1, wherein a shaft of the shaft unit has a multistage shape, wherein a diameter of the shaft decreases from one end to another end along a length direction.

6. The separative tidal current rotor blade of claim 1, wherein a shaft of the shaft unit has a cylindrical, rectangular, or polygonal shape.

7. The separative tidal current rotor blade of claim 1, wherein the blade block comprises a shock absorbing member therein, and an inserting hole through which a shaft of the shaft unit passes is formed at a center of the shock absorbing member.

8. The separative tidal current rotor blade of claim 1, wherein a plurality of combining openings to which the connecting member is coupled and fixed are formed on the hub in a radial form.

9. The separative tidal current rotor blade of claim 1, wherein the plurality of blade blocks are formed of plastic or reinforced plastic.

10. The separative tidal current rotor blade of claim 1, wherein a reinforcing piece for connecting a shaft unit of the connecting member, which is inserted into a fitting hole of the blade block, and the blade block is formed on an inner side of the blade block.

11. The separative tidal current rotor blade of claim 1, wherein the hub includes a combining opening in which the flange of the connecting member is inserted and fitted.

\* \* \* \* \*